United States Patent Office 2,995,572
Patented Aug. 8, 1961

2,995,572
FLUOROSUBSTITUTED 2-HYDROOXETANES AND THEIR PREPARATION FROM FLUOROOLEFINS AND FLUOROALDEHYDES
John F. Harris, Jr., Wilmington, Del., assignor to E. I. du Pont de Nemours and Company, Wilmington, Del., a corporation of Delaware
No Drawing. Filed July 30, 1957, Ser. No. 675,020
5 Claims. (Cl. 260—333)

This invention relates to a new class of cyclic ethers. More particularly it relates to a new class of polyfluorocyclic ethers and to their preparation.

Cyclic ethers as a class are well recognized in the art as useful organic intermediates and as solvents and plasticizers. Generally, such ethers have been limited in their usefulness because of relatively low stability. Recently, perfluorocyclic ethers of from three to five ring carbons have been prepared and have been described in U.S. Patent 2,594,272 as exhibiting a high degree of chemical inertness. While these ethers are of interest because of the stability thereof, they are of only limited usefulness as intermediates in view of their unusual chemical inertness. Furthermore, the electrolytic fluorination process used is not only inefficient but also necessarily involves chemicals which are toxic and difficult to handle.

In my copending United States application Serial No. 666,760, filed June 19, 1957, another new class of cyclic polyfluoroethers is described which combines good stability properties, usefulness as versatile chemical intermediates, and convenience of preparation from easily handled reactants. The ethers of my copending case are polyfluorooxetanes which carry on the 2-carbon two α-fluoroperhalocarbyl radicals, each having at least one ω-acidogenic halogen, with the 3- and 4-ring carbons completely substituted with fluorine, perfluorocarbyl, or ω-hydroperfluorocarbyl radicals. The ω-acidogenic halogens in the 2-substituents are chemically reactive and many interesting derivatives thereof can be prepared. These polyfluorocyclic ethers, it is to be noted, carry on ring carbon only fluorine or polyfluorosubstituted hydrocarbyl radicals.

I have now discovered another new class of polyfluorocyclic ethers which carry one hydrogen on the ring carbon adjacent to ether oxygen and which serve as versatile chemical intermediates therethrough. The ethers of the new class are further characterized by outstanding chemical and physical stability. They can be conveniently prepared from easily handled reactants.

These new cyclic ethers can be more precisely described as polyfluorooxetanes carrying at least two fluorines on the 3- and 4-carbons and one hydrogen and one perfluorocarbyl or ω-hydroperfluorocarbyl radical, i.e., perfluorocarbon ω-hydroperfluorocarbon radical, preferably of no more than ten carbon atoms, on the 2-carbon, with the remaining valences of the 3- and 4-carbons being satisfied by single and direct linkage to halogen, perfluorocarbyl, or ω-hydroperfluorocarbyl radicals, preferably of no more than ten carbon atoms. The perfluorocarbyl radicals can be joined together to form a perfluorocarbocyclic structure of five to seven ring carbons.

While the 2-hydropolyfluorooxetanes containing perfluorocarbyl or ω-hydroperfluorocarbyl substituents variously in the 2-, 3-, and/or 4-positions all form part of my generic invention and accordingly have a good many, if not most, physical and chemical properties in common, they still constitute separate species within the genus 2-hydropolyfluorooxetanes and do differ in important respects. Thus, compounds having perfluoro substituents are substantially so unreactive chemically through such substituents as to afford no possible use as chemical intermediates. Conversely, while still quite chemically stable, compounds having ω-hydroperfluoro substituents are still capable under rigorous conditions of serving as chemical intermediates through such substituents. Thus, the ω-hydrogen atoms can be replaced by chlorine through vigorous chlorination. The resultant chlorosubstituted compounds, in view of the much greater order of magnitude reactivity of the acidogenic halogen, serve readily for conversion by generically recognized reactions to other interesting chemical compounds.

The novel 2-hydropolyfluorooxetanes of my invention can be represented by the following structural formula:

(1) 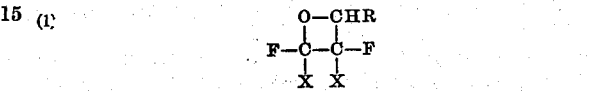

wherein R is a perfluorocarbyl or ω-hydroperfluorocarbyl radical and the X's, which can be alike or different, are halogen, ω-hydroperfluorocarbyl, or perfluorocarbyl radicals. In the event the X substituents are perfluorocarbyl radicals, they can be together joined to form a perfluorocarbocycle of five to seven ring carbons.

The most preferred compounds of the present invention are the 2H-3,4,4-trifluorooxetanes which have the following structural formula:

(2) 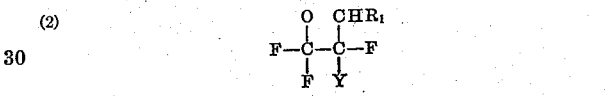

where $R_1$ is a perfluoroalkyl or ω-hydroperfluoroalkyl radical of no more than eight carbons and Y is halogen of atomic number 9–35, most preferably fluorine, or a perfluoroalkyl or ω-hydroperfluoroalkyl radical of no more than eight carbons. The compounds of Formula 2 are especially preferred because the intermediates used in their preparation are readily available.

These new polyfluoro-2-hydrooxetanes can be readily prepared by direct reaction under the influence of actinic light between a polyfluoroolefin of the formula $$XCF=CFX$$

and a polyfluoroaldehyde of the formula RCHO, wherein R and the X's are as above indicated. The ovel-all reaction can be represented as follows:

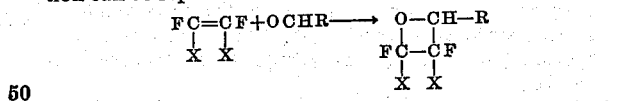

It will be noted that the oxygen of the polyfluoroaldehyde becomes the ring, i.e., 1-, oxygen of the oxetane. The carbonyl carbon of the polyfluoroaldehyde becomes the 2-carbon of the oxetane and, therefore, necessarily carries the single ring hydrogen and the perfluorocarbyl or ω-hydroperfluorocarbyl radical R of the polyfluoroaldehyde. The two doubly bonded carbons of the polyfluoroolefin reactant become the 3- and 4-carbons of the oxetane, and the substituents thereon become, therefore, the substituents on the 3- and 4-ring carbons of the oxetane.

In the event that both the 1- and 2-carbons of the polyfluoroolefin carry a perfluorocarbyl substituent, these may be together joined to form with the 1- and 2-fluoro-bearing carbons a carbocyclic perfluoroolefin, and this in turn can be reacted with a polyfluoroaldehyde to give a compound of this invention.

The process of my invention preferably comprises exposing to actinic light a mixture of ω-hydroperfluoroalkyl- or perfluoroalkylaldehyde, i.e., an ω-hydroperfluoroalkanal or perfluoroalkanal of no more than nine carbons, and a polyfluoroolefin containing a terminal difluoromethylene group and more specifically a 1,1,2-trifluoroolefin, wherein the remaining single valence of the 2-carbon is satisfied by linkage to a halogen of atomic number 9–35, inclusive, and especially fluorine, or an ω-hydroperfluoroalkyl or perfluoroalkyl radical of no more than eight carbons. Thus, the preferred olefins in the process of the invention are perfluoro and ω-hydroperfluoro terminal olefins of from two to ten carbons.

From the foregoing it is apparent that there can be used any wholly carbon chain perfluoro- and ω-hydroperfluorocarboxaldehyde of no more than eleven carbons and preferably of no more than nine carbons. Particularly outstanding because of their being readily available are such carboxaldehydes which are aliphatic in character, i.e., the aliphatic and cycloaliphatic carboxaldehydes, i.e., the alkanals and cycloalkanals. Suitable specific illustrations of these polyfluoroaldehydes in addition to those given in the examples which follow include: perfluoroaldehydes, e.g., trifluoroacetaldehyde, perfluoropropionaldehyde, perfluoro-n-butyraldehyde, and the like; the ω-hydroperfluoroaldehydes, e.g., difluoroacetaldehyde, 3H-tetrafluoropropionaldehyde, 5-H-octafluorovaleraldehyde, 7H-dodecafluoroheptanal, 9H-hexadecafluorononanal, 11H-eicosafluorohendecanal, and the like.

The compounds to be reacted with the aforesaid described polyfluoroaldehydes are, as will be apparent from the above discussion, the 1,2-difluoroolefins wherein the remaining single valances of the 1- and 2-carbons are satisfied by direct and single linkage to halogen, e.g., chlorine, bromine, iodine, and especially fluorine, ω-hydroperfluorocarbyl, or perfluorocarbyl radicals, the last of which may be together joined to form a cyclic polyfluoroolefin of from five to seven ring members. Generally, the acyclic olefins are preferred because they are more readily available and more reactive.

Specific illustrations of the polyfluoroolefins which are suitable for use in the process of my invention include those wherein another halogen is present on the olefinic carbons, e.g., chlorotrifluoroethylene; the perfluorocarbon olefins, straight chain in nature, such at tetrafluoroethylene, hexafluoropropene, perfluoropentene-1, perfluorohexene-1, perfluoroheptene-1, all of which contain terminal carbon-carbon ethylenic unsaturation; the acyclic wholly carbon chain perfluoroolefins containing internal carbon-carbon unsaturation, such as perfluorobutene-2, perfluorohexene-3; the wholly carbon chain perfluoroolefins containing a plurality of carbon-carbon unsaturations, such as perfluoro-1,3-butadiene; the cyclic perfluoroolefins, in particular the perfluoromonoolefins, such as perfluorocyclohexene; the wholly carbon chain acyclic ω-hydroperfluoroolefins, such as ω-hydroperfluorobutene-1, ω-hydroperfluorohexene-1, ω-hydroperfluorooctene-1, ω-hydroperfluorodecene-1, ω-hydroperfluorododecene-1, and the like.

The carbon chain of the perfluoro- and ω-hydroperfluoroolefins will generally not exceed 12, and preferably 10, carbons. The substituents on the ethylenic carbons became the substituents on the 3- and/or 4-carbon of the new polyfluorooxetanes, and, accordingly, the carbon chains of the radicals pendent on these 3- and 4-ring carbons will not exceed a total of 12 and preferably 10 carbons.

In the preparation of the new polyfluorooxetanes of this invention by the direct reaction between members of the aforesaid classes of polyfluoroaldehydes and polyfluoroolefins, any source of actinic light can be used. Because of improved reaction efficiency sources relatively high in UV output are preferred. Generally speaking, the mercury vapor arc lamps will be used since they afford a relatively intense source of the preferred UV light. A wide variety of such lamps are available on the market, and any or all can be used, including both low and high pressure lamps with various types of glass envelopes. The most preferred of these are those with quartz envelopes since the highest percent transmission of UV is achieved thereby.

The reaction can be effected properly in the presence or absence of an inert organic medium which, if present, should be anhydrous. Any inert liquid organic diluent can be used and generally speaking the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoroaliphatic hydrocarbons, e.g., 1,1,2,2-tetrafluoro-3,3-dimethylbutane, and the like; the polyfluoro aliphatic/cycloaliphatic hydrocarbons, e.g., perfluorodimethylcyclohexane, and the like. The choice of the particular diluent is not at all critical and will vary with such other normal variables as the reaction temperature found necessary. In most instances, in order to simplify the reaction, no diluent is used. The requisite polyfluoroaldehyde and polyfluoroolefin are mixed, irradiated with ultraviolet light for the necessary reaction time, and the products simply isolated by direct precision fractionation of the reaction mixture. The absence of a diluent generally makes the separation easier.

The cycloaddition can be carried out at temperatures ranging from below zero degree centigrade to generally no higher than 150 to 200° C., varying with the relative reactivity and the physical properties of the polyfluoroaldehyde and polyfluoroolefin reactants. Generally speaking, the higher temperature ranges will be avoided since operation under such conditions usually requires reaction equipment resistant to high pressures which is extremely difficult to fabricate from materials which would permit transmittal of the necessary radiation. Alternatively, the reaction can be carried out at higher temperatures under the requisite pressures with an internal source of ultraviolet irradiation in the reactor. However, such procedures are obviously not desirable and the reaction is generally carried out in simple glass equipment at substantially room temperature, ranging up to whatever temperature is effected in the reaction zone due to thermal effects created by the radiation source.

Practically speaking, since many of the shorter chain polyfluoroolefins are low boiling, the reaction zone is maintained in the liquid condition through a reflux condenser to trap the olefin, generally using solid carbon dioxide/acetone as a cooling medium. The pressure at which the reaction is carried out is largely immaterial and will vary as will be apparent to those skilled in the art with the specific nature of the reactants and the operating temperatures being used. Obviously for convenience, the reaction is preferably carried out in glass equipment at substantially atmospheric pressure or at pressures no greater than two to five atmospheres.

The new polyfluorooxetanes of this invention range from clear, colorless liquids to low melting solids, depending generally on the total number of carbons in the molecule. Those containing less than about 18 carbons, which are the most common, are clear, colorless liquids boiling normally from 100–300° C. They exhibit high hydrolytic stability, both under aqueous acid and aqueous base conditions. They are soluble in alkanols, ethers, and various perfluorocarbon solvents, but insoluble in water and solutions containing high percentages of water. They also exhibit outstanding resistance against thermal and oxidative degradation and are, in fact, nonflammable.

The compounds of my invention are thus useful as "stable liquid" materials, for example, as transformer fluids, fluids for high temperature power transmissions, or hydraulic systems, or liquid-coupled mechanical drives. They also have generic utility as chemical intermediates. For instance, the ring hydrogen of the polyfluoro-2-hydrooxetanes of the present invention can be replaced by chlorine through vigorous chlorination. The resulting products containing the 2-chlorine substituent can be readily converted to other interesting chemical intermediates by conventional methods for replacement and modification of the relatively reactive ring chlorine substituent by methods generically known in the art.

The new polyfluoro-2-hydrooxetanes of this invention and a process for the preparation thereof are illustrated in greater detail by the following examples in which the parts given are by weight. It will be appreciated that the examples are not intended to limit the invention, since the invention is susceptible to modification without departure from the letter and spirit of the appended claims.

*Example I*

A mixture of 63 parts of hexafluoropropene-1 and 60.5 parts (0.73 molar proportion based on the olefin) of perfluoro-n-butyraldehyde in a cylindrical quartz reactor approximately four diameters long, maintained at atmospheric pressure and under reflux from a solid carbon dioxide/acetone-cooled condenser, was exposed to the UV light from a low-pressure, 10-watt, quartz, mercury "resonance" lamp fitted in a spiral around the reactor for a period of twelve days. The resulting reaction mixture was separated by precision fractionation through a spinning band distillation column of the type described and claimed in U.S. Patent 2,712,520. There was obtained 38.4 parts (37% of theory) of 3,4,4-trifluoro-3-trifluoro methyl-2-perfluoro-n-propyloxetane as a clear, colorless liquid boiling at 84–86° C. at atmospheric pressure. The product can also be named 2H-perfluoro-3-trifluoromethyl-2-perfluoro-n-propyloxetane.

*Analysis.*—Calc'd. for $C_7HF_{13}O$: C, 24.2%; H, 0.3%; F, 70.8%. Found: C, 24.7%; H, 0.6%; F, 69.1%.

The infrared spectrum showed no absorption indicative of the carbonyl group. A vapor phase chromatogram in the manner of Evans, et al., J. Chem. Soc., 1955, 1184 showed two peaks of approximately equal area, thus indicating that the product consists of two isomers, probably the cis-transisomers.

*Example II*

A mixture of 10 parts of hexafluoropropene and 65 parts (0.91 molar proportion based on the olefin) of trifluoroacetaldehyde was irradiated under the conditions described in Example I for eleven days. Upon fractionation as before there was obtained 44 parts (27% of theory) of 3,4,4-trifluoro-2,3-bis(trifluoromethyl)oxetane as a clear, colorless liquid boiling at 32–40° C. at atmospheric pressure.

*Analysis.*—Cal'd. for $C_5HF_9O$: C, 24.2%; H, 0.4%; F, 68.9%. Found: C, 24.5%; H, 0.6%; F, 68.7%.

Through vapor phase chromatography the product was separated into two isomers boiling at 38–39° C. and 41–42° C. at atmospheric pressure. Nuclear magnetic resonance spectra are consistent with cis-trans isomers.

*Example III*

A mixture of 40 parts of 4-hydroperfluorobutene-1 (i.e., 4H-heptafluorobutene-1) and 20 parts (0.93 molar proportion based on the olefin) of trifluoroacetaldehyde was irradiated under the conditions described in Example I for three days. There was obtained upon fractionation 37.8 parts (66% of theory) of 3-(2H-tetrafluoroethyl)-3,4,4-trifluoro-2-trifluoromethyloxetane as a clear, colorless liquid boiling as follows:

| | Parts |
|---|---|
| Cut 1—75–80° C. | 11.9 |
| Cut 2—78–84° C. | 9.0 |
| Cut 3—84–87° C. | 11.5 |
| Cut 4—87–90° C. | 5.4 |
| Total | 37.8 |

Vapor phase chromatograms of cuts 1 and 4 showed them to be essentially pure materials but different from each other. Cuts 2 and 3 were shown to be mixtures of the two materials. Infrared spectra of cuts 1 and 4 indicated only trace quantities of carbonyl. Nuclear magnetic resonance spectra are consistent with cis-trans isomers.

*Analysis.*—Calc'd. for $C_6H_2F_{10}O$: C, 25.7%; H, 0.7%; F, 67.9%. Found—cut 1: C, 25.9%; H, 1.0%; F, 67.1%. Found—cut 4: C, 26.2%; H, 1.0%; F, 66.7%.

*Example IV*

A mixture of 35 parts of hexafluoropropene-1 and 24.9 parts (0.46 molar proportion based on the olefin) of ω-hydroperfluorovaleraldehyde (δ·H-octafluorovaleraldehyde) was irradiated under the conditions described in Example I for twelve days. Upon fractionation as before there was obtained 24.2 parts (59% of theory) of 2-(4H-octafluoro-n-butyl) - 3,4,4-trifluoro - 3 - trifluoromethyloxetane as a clear, colorless liquid boiling at 120–126° C. at atmospheric pressure.

*Analysis.*—Calc'd. for $C_8F_{14}H_2O$: C, 25.3%; H, 0.5%; F, 69.9%. Found: C, 25.7%; H, 0.8%; F, 70.2%.

A vapor phase chromatogram of the product indicated it to be a mixture of approximately equal amounts of two isomers, presumably the cis-trans isomers.

*Example V*

A mixture of 27 parts of chlorotrifluoroethylene and 25 parts (0.47 molar proportion based on the olefin of ω-hydroperfluorovaleraldehyde was irradiated under the conditions described in Example I for three days. The reaction mixture was filtered, and upon fractionation as before there was obtained 14.2 parts of recovered ω-hydroperfluorovaleraldehyde and 5.6 parts (34% of theory) of crude 3-chloro-2-(4H-octafluoro-n-butyl)-3,4,4 - trifluoroxetane as a clear, colorless liquid boiling over the range 126–136° C. at atmospheric pressure. Upon further purification by vapor phase chromatography, the pure 3-chloro-2-(4H-octafluoro-n-butyl)-3,4,4 - trifluorooxetane was obtained as a clear, colorless liquid boiling at 136° C. at atmospheric pressure; $n_D^{25}$, 1.3204.

*Analysis.*—Calc'd for $C_7H_2ClF_{11}O$: Cl, 10.2%; F, 60.3%. Found: Cl, 10.2%; F, 59.6%.

Suitable further specific illustrations of the new polyfluorooxetanes of this invention, in addition to those given in detail in the foregoing examples, can be obtained by reacting the polyfluoroaldehyde with the necessary polyfluoroolefin all in the manner set forth in detail above. Thus, from chlorotrifluoroethylene and trifluoroacetaldehyde there will be obtained 3-chloro-3,4,4-trifluoro-2-trifluoromethyloxetane; from tetrafluoroethylene and perfluoropropionaldehyde there will be obtained 3,3,4,4-tetrafluoro-2-perfluoroethyloxetane; from hexafluoropropene and perfluoro-n-butyraldehyde there will be obtained 3,4,4-trifluoro-3-trifluoromethyl-2-perfluoropropyloxetane; from perfluoropentene-1 and difluoroacetaldehyde there will be obtained 3,4,4-trifluoro-2-difluoromethyl-3-perfluoropropyloxetane; from perflouorohexene-1 and 2H-tetrafluoropropionaldehyde there will be obtained 3,4,4-trifluoro-3-perfluoro-n-butyl - 2-(2H - tetrafluoroethyl)oxetane; from perfluoroheptene-1 and 5H-octafluorovaleraldehyde there will be obtained 3,4,4-trifluoro-3-perfluoroamyl-2-(4H-octafluoro-n-butyl)oxetane; from perfluorobutene-2 and 7H-dodecafluoro-n-heptanal there will be obtained 3,4-difluoro-3,4-bis(trifluoromethyl)-2-(6H-dodecafluoro-n-hexyl)oxetane; from perfluorohexene-3 and 9H-hexadecafluorononanal there will be obtained 3,4-difluoro-3,4-bis(perfluoroethyl)-2-(8H-hexadecafluoro-n-octyl)oxetane; from perfluorobutadiene-1,3 and 11H-eicosafluorohendecanal there will be obtained 3,4,4-trifluoro-2-(10H-eicosafluoro-n-decyl) - 3-perfluorovinyloxetane; from perfluorocyclohexene and trifluoroacetaldehyde there will be obtained 3,4-difluoro-2-trifluoromethyl-3,4 - perfluorotetramethyleneoxetane, which can more properly be described as 7-oxabicyclo[4.2.0]-8-trifluoromethylperfluorooctane or, alternatively, 7-oxabicyclo[4.2.0] - 1,2,2,3,3,4,4,5,5,6,8 - hendecafluoro - 8-trifluoromethyloctane; from 4H-heptafluorobutene-1 and perfluoropropion aldehyde there will be obtained 3,4,4- trifluoro - 3 - (2H-tetrafluoroethyl)-2-perfluoroethyloxetane; from 6H-hendecafluorohexene-1 and perfluoropropionaldehyde there will be obtained 3,4,4-trifluoro-3-(4H-octafluoro-n-butyl)-2-perfluoroethyl oxetane; from 8H-pentadecafluorooctene-1 and 3H-tetrafluoropropionaldehyde there will be obtained 3,4,4-trifluoro-2-(2H-tetrafluoroethyl)-3-(6H - dodecafluoro-n-hexyl)oxetane; from 10H-nonadecafluorodecene-1 and 5H-octafluorovaleraldehyde there will be obtained 3,4,4-trifluoro-2-(4H-octafluoro-n-butyl)-3-(8H-hexadecafluoro - n - octyl)oxetane; from 12H-tricosafluorododecene-1 and 7H-dodecafluoroheptanal there will be obtained 3,4,4-trifluoro-2-(6H-hexadecafluoro-n-hexyl)-3-(10H-eicosafluoro - n - decyl)-oxetane; and the like.

It will be appreciated that there are various specific embodiments of the invention which may be practiced without departure from the letter and spirit of the appended claims.

The embodiments of the invention in which an exclusive property or privilege is claimed are defined as follows:

1. A polyfluorooxetane in which the 2-carbon carries a hydrogen atom and a member of the group consisting of perfluorocarbon radicals of 1–10 carbon atoms and ω-hydroperfluorocarbon radicals of 1–10 carbon atoms and in which the 3- and 4-carbons each carry from 1–2 fluorine substituents with the single remaining valence for each of said 3- and 4-carbons being satisfied by single and direct linkage to a member of the group consisting of halogen of atomic number from 9–35, ω-hydroperfluorocarbon radicals of 1–10 carbon atoms and perfluorocarbon radicals of 1–10 carbon atoms.

2. A 2H–3,4,4-trifluorooxetane in which the 2-carbon carries a member of the group consisting of perfluoroalkyl radicals of 1–10 carbon atoms, and ω-hydroperfluoroalkyl radicals of 1–10 carbon atoms, and in which the 3-carbon has attached to it a member of the class consisting of halogens of atomic number 9–35, ω-hydroperfluoroalkyl radicals of 1–10 carbon atoms, and perfluoroalkyl radicals of 1–10 carbon atoms.

3. A compound of claim 2 wherein each of the fluoroalkyl radicals is of one to eight carbon atoms and halogen is fluorine.

4. A process which comprises exposing to actinic light a mixture of a polyfluoroaldehyde of from 2 to nine carbons and selected from the group consisting of ω-hydroperfluoroalkanals and perfluoroalkanals, and a 1,1,2-trifluoroolefin wherein the remaining single valence of the 2-carbon is satisfied by linkage to a member of the group consisting of halogens of atomic numbers of from 9–35, inclusive, ω-hydroperfluoroalkyl radicals of 1–8 carbon atoms and perfluoroalkyl radicals of 1–8 carbon atoms, and isolating the resulting polyfluoro-2H-oxetane.

5. Process of claim 4 wherein said halogen is fluorine.

References Cited in the file of this patent

UNITED STATES PATENTS

| | | |
|---|---|---|
| 2,368,186 | Wickert et al. | Jan. 30, 1945 |
| 2,392,294 | Rust et al. | Jan. 1, 1946 |
| 2,473,497 | Bortnick | June 21, 1949 |
| 2,522,590 | Vaughan et al. | Sept. 19, 1950 |
| 2,594,272 | Kauck | Apr. 29, 1952 |

FOREIGN PATENTS

| | | |
|---|---|---|
| 718,318 | Great Britain | Nov. 10, 1954 |

OTHER REFERENCES

A. Schonberg et al.: Berichte, vol. 66, 1933, pp. 567–571.

G. A. R. Brandt et al.: J. Chem. Soc. (London), 1952, pp. 2198–2205.

UNITED STATES PATENT OFFICE
CERTIFICATE OF CORRECTION

Patent No. 2,995,572                  August 8, 1961

John F. Harris, Jr.

It is hereby certified that error appears in the above numbered patent requiring correction and that the said Letters Patent should read as corrected below.

Column 1, line 55, after "perfluorocarbon" insert -- or --; column 2, lines 28 to 31, the structural formula (2) should appear as shown below instead of as in the patent:

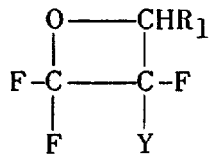

same column 2, line 45, for "ovel-all" read -- over-all --; column 3, line 39, for "at" read -- as --; line 56, for "became" read -- become --; column 4, line 1, after "organic" insert -- reaction --; column 5, line 40, for "10" read -- 110 --; line 65, for "75-80° C." read -- 75-78° C. --.

Signed and sealed this 6th day of February 1962.

(SEAL)
Attest:

ERNEST W. SWIDER                          DAVID L. LADD
Attesting Officer                     Commissioner of Patents